United States Patent [19]

Gould

[11] Patent Number: 4,547,774
[45] Date of Patent: Oct. 15, 1985

[54] OPTICAL COMMUNICATION SYSTEM FOR DRILL HOLE LOGGING

[75] Inventor: Gordon Gould, Gaithersburg, Md.

[73] Assignee: Optelcom, Inc., Gaithersburg, Md.

[21] Appl. No.: 650,126

[22] Filed: Sep. 13, 1984

Related U.S. Application Data

[63] Continuation of Ser. No. 285,146, Jul. 20, 1981, abandoned.

[51] Int. Cl.[4] .............................................. G01V 1/40
[52] U.S. Cl. ................................... 340/854; 250/263; 350/96.2; 367/76; 455/610; 455/612
[58] Field of Search ................. 340/853, 854; 367/79, 367/76, 81, 178; 455/600, 612, 609, 610; 372/41; 350/96.15, 96.2, 266, 272, 273; 250/256, 261, 262, 263, 368, 233; 370/1–4; 181/102

[56] References Cited

U.S. PATENT DOCUMENTS

| | | | |
|---|---|---|---|
| 3,905,010 | 9/1975 | Fitzpatrick | 340/853 |
| 4,107,517 | 1/1977 | Cooper | 250/199 |
| 4,115,753 | 9/1978 | Shajenko | 367/81 |
| 4,156,104 | 5/1979 | Mondello | 174/70 R |
| 4,162,400 | 7/1979 | Pitts, Jr. | 340/854 |
| 4,189,705 | 2/1980 | Pitts, Jr. | 250/262 |
| 4,249,266 | 2/1981 | Nakamori | 455/612 |
| 4,261,638 | 4/1981 | Wagner | 350/96.2 |
| 4,265,122 | 5/1981 | Cook et al. | 73/627 |
| 4,278,323 | 7/1981 | Waldman | 350/96.2 |
| 4,279,465 | 7/1981 | Vojvodich | 350/96.2 |
| 4,302,835 | 11/1981 | McMahon | 367/79 |
| 4,346,478 | 8/1982 | Sichling | 455/612 |

FOREIGN PATENT DOCUMENTS 0047704 3/1982 European Pat. Off. .

OTHER PUBLICATIONS

C. L. Tang, "Solid State Lasers", *Quantum Electronics*, vol. 15, Part A, (1979), p. 168, [Academic Press].
R. O. Harger, *Optical Communication Theory*, p. 255.

*Primary Examiner*—Salvatore Cangialosi
*Assistant Examiner*—K. R. Kaiser
*Attorney, Agent, or Firm*—Kerkam, Stowell, Kondracki and Clarke

[57] ABSTRACT

An optical communication system for drill hole logging comprises an armored cable containing one or more glass clad optical fibers inside a tubular moisture barrier, a neodymium laser in the cable reel radiates infrared light into one of the fibers, a modulator in the downhole cable-head connector shell modulates light and returns it to the surface, and a semiconductor detector in the reel demodulates the data signal from the returning light.

14 Claims, 7 Drawing Figures

FIG. I.

OPTICAL COMMUNICATION SYSTEM FOR DRILL HOLE LOGGING

This is a continuation of application Ser. No. 285,146, filed July 20, 1981 now abandoned.

TECHNICAL FIELD

The invention relates to drill hole logging equipment, whereby date are transmitted from a downhole instrument probe to the surface at a high rate.

BACKGROUND OF THE INVENTION

The fastest bit rate transmittable through electromechanical cables from the deepest oil wells (10,000 meters) is a few tens of kilohertz. In contrast, the ever more sophisticated multiple-sensor probes under development have created a need for higher transmission rates. The well-known broad band characteristics of optical fibers, together with the long lengths transmissible without repeaters, make this possible. The fiber, of course, must be incorporated into an armored cable without adding significant light loss due to perturbations of the fiber ("microbends").

The problem of implementing an optical fiber transmission system arises from the very hostile environment encountered in deep drill holes. They are filled with corrosive brine, often with dissolved hydrogen sulfide. the pressure in drilling mud may be as high as 30,000 PSI. The temperature may be as high as 250° C. Other limitations are that electrical power and space are at a premium in the downhole probe. It must be convenient to connect and disconnect the cable and probe. Finally, the probes are often lost downhole. Thus the transmitter cannot be inordinately expensive.

No component of the conventional optical transmission systems can function satisfactorily in the downhold environment without cooling. Semiconductor lasers and LEDs (light emitting diodes) do not operate above 100° C. High pressure connectors which provide a make/break optical pathway from cable-head to probe do not exist. All plastics lose their integrity in the extreme downhole environment. Even fluorinated compounds, which are chemically inert, tend to flow under stress. An additional problem is that water penetrates plastics and promotes stress corrosion of the glass fiber.

Related prior art is disclosed in U.S. Pat. No. 4,156,104, Mondello issued May 22, 1979. While the cable described in this patent is "waterproof", it could not resist abrasion or be flexed repeatedly without fatigue failure.

SUMMARY OF THE INVENTION

These problems are simultaneously solved by using in the drill hole an optical fiber data transmission system constructed in accordance with the invention.

In an illustrative embodiment, the system comprises an armored cable containing one or more glass clad optical fibers inside a tubular moisture barrier, a neodymium laser in the cable reel to radiate infrared light into one of the fibers, a modulator in the downhole cable head connector shell in modulate light and return it to the surface, and a semiconductor detector in the reel to demodulate the data signal from the returning light.

As a feature of the invention, the neodynium laser is constrained to oscillate at a wavelength of approximately 1.32 micrometers. At this wavelength Rayleigh scattering loss is minimal compared with shorter wavelengths, and on the other hand, the thermal noise in the detector is small compared with that at longer wavelengths.

DETAILED DESCRIPTION OF THE INVENTION

Figure 1:
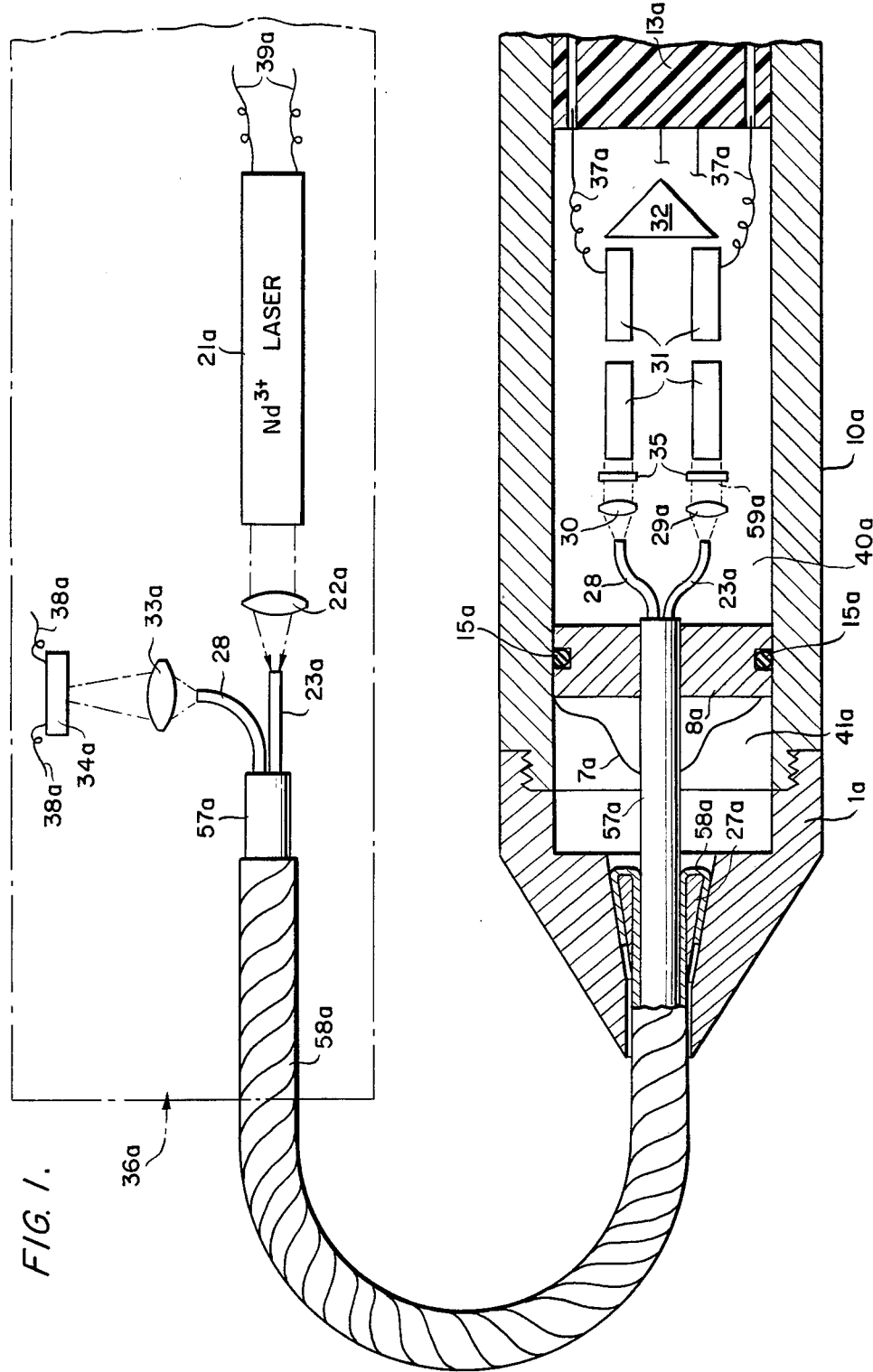
FIG. 1 illustrates the novel combination of features which, in accordance with the teaching of the invention, provides a solution to the problem of transmitting data rapidluy from a downhole logging probe to the surface.

Referring now to the drawing, FIG. 1 depicts schematically a configuration of the components of the fiber optic drill hole logging data transmission system, in accordance with the invention. The neodymium laser light source, 21a and the detector, 34a, are housed in the barrel, 36a, of the cable reel. Electrical connections are made by wires, 39a, through slip-rings (not shown) to the mounting platform. The armored cable, 58a, leads from the reel over sheaves (now shown) down into the drill hole, and is terminated inside the cable head connector shell, 10a. The laser beam is focussed by a lens, 22a, into the core of the glass clad fiber, 23a, in the cable. At the downhole end, the fiber is connected to a light modulator, 31, (described below) inside a chamber, 40a, sealed against the outside environment. Wires, 37a, conducting driving power to the modulator, lead from a multipin electrical connector, 13a, which mates with the instrument probe (not shown), or with mating connector half which is connected to the probe by a short length of electrical cable. Thus, a precise transmission of light through the make/break connector interface is avoided. The cable also contains power and control conductors (not shown) which lead to the connector, 13a.

The conventional optically pumped crystal laser doped with neodymium ions, $Nd^{3+}$, oscillates near the wavelength, $\lambda=1.06$um. However, by making the laser resonator lossy at $\lambda=1.06$um, the laser can be forced to oscillate near $\lambda=1.32$um. This is desirable since, in glass clad fibers, light is lost by scattering at inhomogeneities introduced during manufacture. The loss rate due to this inherent mechanism, varies as $\lambda^{-4}$. Thus, in traversing 20 kilometers of fiber down and back up, there is about 15dB difference in light power loss at these two respective wavelengths. The neodymium laser provides sufficient light power (upwards of 0.1 watt) to make the round trip with received power to spare. This avoids a need to install in the downhole probe or connector what would, at best, be an inefficient and bulky laser.

Figure 4:
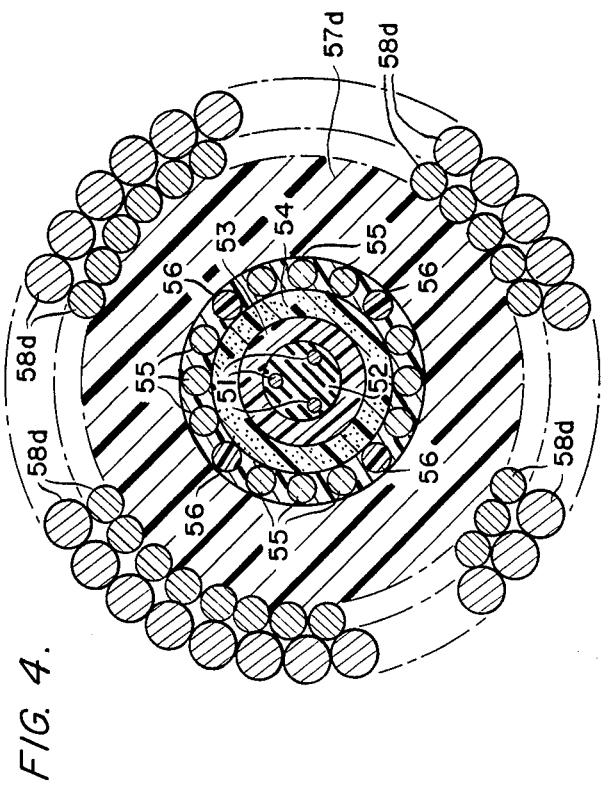
FIG. 4 is a drawing of the cross-section of an armored optical fiber cable, which was designed in accordance with the teaching of the invention.

FIG. 4 depicts the cross-section of a cable illustratively designed in accordance with the invention. In this embodiment, three glass clad fibers, 51 (one of which corresponds to the fiber, 23a, of FIG. 1), are encased in a jacket, 53, which has the following essential properties:

A. It must be hard and stiff to protect the fibers against bending during subsequent cabling operations, such as the laying on of the outer armor, 58d. This is essential since "microbending" allows light to leak out of the fiber cladding — that is the attenuation is increased thereby. Any bubbles or voids in the first soft plastic "buffer" coat, 52, around the fibers, 51, will be compressed and thereby induce microbends, unless the jacket is sufficiently incompressible that the ambient pressure is not transmitted.

B. The jacket, 53, must be pinhole free and resist diffusion of the ambient liquid. This is not only to keep down the pressure, but to protect the fiber, and its plastic buffer, against chemical attack. The microcracks in the surface of a glass clad fiber under tension, will propagate in the presence of moisture, and cause the fiber to break.

In the illustrative design of FIG. 4, three fibers, 51 are dip-coated with silicone rubber elastomer, 52, to form a symmetric buffered core. Additional buffering may be provided by an additional plastic sheath. During this coating process the fibers are twisted into a helix of long pitch — e.g. 1.5 inch long. Besides easing the bending of the core, this helix has the additional advantage that, as the completed cable undergoes a tensile strain, the fibers will tend to straighten out, compressing the elastomer, and the core will lengthen, without the glass fibers themselves undergoing as great a strain as the overall cable. This reduces the chance of breakage.

The buffered core, 52, is encased in a hard jacket capable of withstanding the pressure, and of low diffusivity to protect the inner components from attack by the brine. The jacket may comprise more than one layer. For example, a lyer, 53, may be hard and crush resistant, while a second layer, 54, is of low diffusivity and resistant to corrosive attack. Thus, the two layers, 53 and 54, in combination provide the required jacket qualities. Illustratively, layer 53 may be a high temperature epoxy polymer filled with longitudinal fiberglass strands. This jacket material, applied by the well-known "pultrusion" technique, has been found to add very little to the light loss in the fibers due to microbends, even at high pressure or tension. As the liquid epoxy is cured or polymerized, it conforms precisely to the buffered fibers without causing microbends. Also, if it is cured thermally, it contracts and compresses the fiber longitudinally. This tends to counter the effect of a tensile strain and thermal expansion in the cable armor. Layer 54 may be a fluorinated compound, such as one of Dupont's Teflons. These plastics are chemically inert and of low diffusivity. Alternatively, and preferably for highest temperature operation, the jacket layer, 53, may be a metal tube, impervious to water. For example, a welded nickel-steel alloy tube, with 0.095" O.D. and 0.0083" wall thickness has been tested to 15,000 PSI without being crushed.

In order to provide power downhole, the fiber protecting jacket, 53 and 54, is surrounded by an annular ring of conductors, 55, divided into groups insulated from each other by spacers, 56. Alternatively, the bundles of wires can each have their own insulation. The conductors in turn are covered by an extruded insulating plastic layer, 57d, which again is preferably a fluorinated compound to resist chemical attack at high pressure and temperature. In an alternative design, the layer, 57d, can be constructed like the jacket, 53 and 54. That is, both the fibers, 51, and the conductors, 55, can be contained within the hard, pressure resistant and low-diffusivity jacket.

The layer, 57d, besides being a brine barrier, also serves as bedding for the double-layer, counter-helical, torque-balanced armor, 58d. This armor must be on the outside of any working drill hle logging cable to resist the abrasion resulting from raising and lowering the instrument probe.

Without in anyway affecting the generality of the foregoing description, Table I below presents the dimensions of the various elements of the armored optical fiber cable made for drill hole logging data transmission, which is depicted in FIG. 4.

TABLE I

| | |
|---|---|
| Glass clad fiber, 51, diameter, each of 3 | 140 um |
| Silicone rubber buffer, 52 | 0.032 inch O.D. |
| Fiberglass filled epoxy, 53 | 0.054 inch O.D. |
| Dupont PFA Teflon, 54 | 0.064 inch O.D. |
| 4 groups of Cu wires, 55, diameters | 0.0089 inch |
| PFA insulation and armor bed, 57d | 0.114 inch O.D. |
| 2 layers of steel armor, 58d | 0.185 inch O.D. |

Now referring again to FIG. 1, the armored fiber optic cable is terminated downhole inside the cablehead connector shell, 10a. The armor, 58a, which constitutes the main strength member of the cable, may be retained in the cablehead in any of several conventional ways. For example, it may be bent around the ring, 27a, and jammed into the conical end of the connector, 1a. The low pressure chamber, 40a, is isolated from the flooded chamber, 41a, by the barrier, 8a. Spacers and other details have been omitted for clarity. The barrier, 8a, is sealed against the connector shell, 10a, by the o-ring, 15a, and against the low-diffusivity cable layer, 57a, by an elastomeric boot, 7a. If the chamber, 41a, is not prefilled with a protective grease, the boot, 7a, should be made of a fluorinated elastomer to resist chemical attack.

Figure 3:
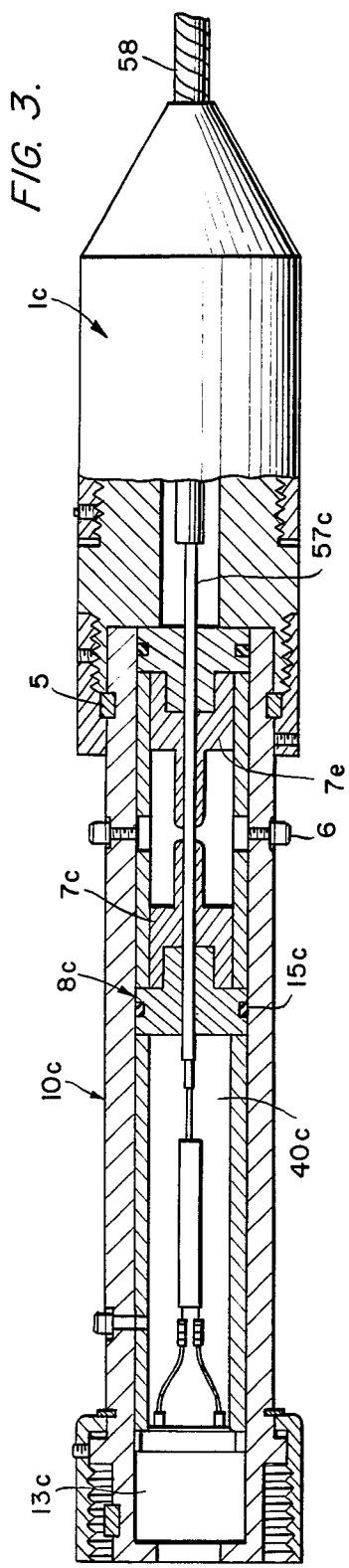
FIG. 3 is a half-scale drawing of an actual embodiment of the cablehead connector, which was made for use in drill hole logging.

FIG. 3 is a ½ scale drawing of the cablehead connector actually built for use with cable described in FIG. 4 and Table 4. The assembly and function of the connector is as described with reference to FIG. 1, except that an additional boot seal, 7e, is provided. The boot seal, 7e, is positioned back-to-back with the boot seal, 7c, to permit pressure testing of the seals on the fiber core, 57c, before lowering into the drill hole. The test is performed by introducing oil at high pressure through the holes which are later sealed by screws, 6.

Figure 2:
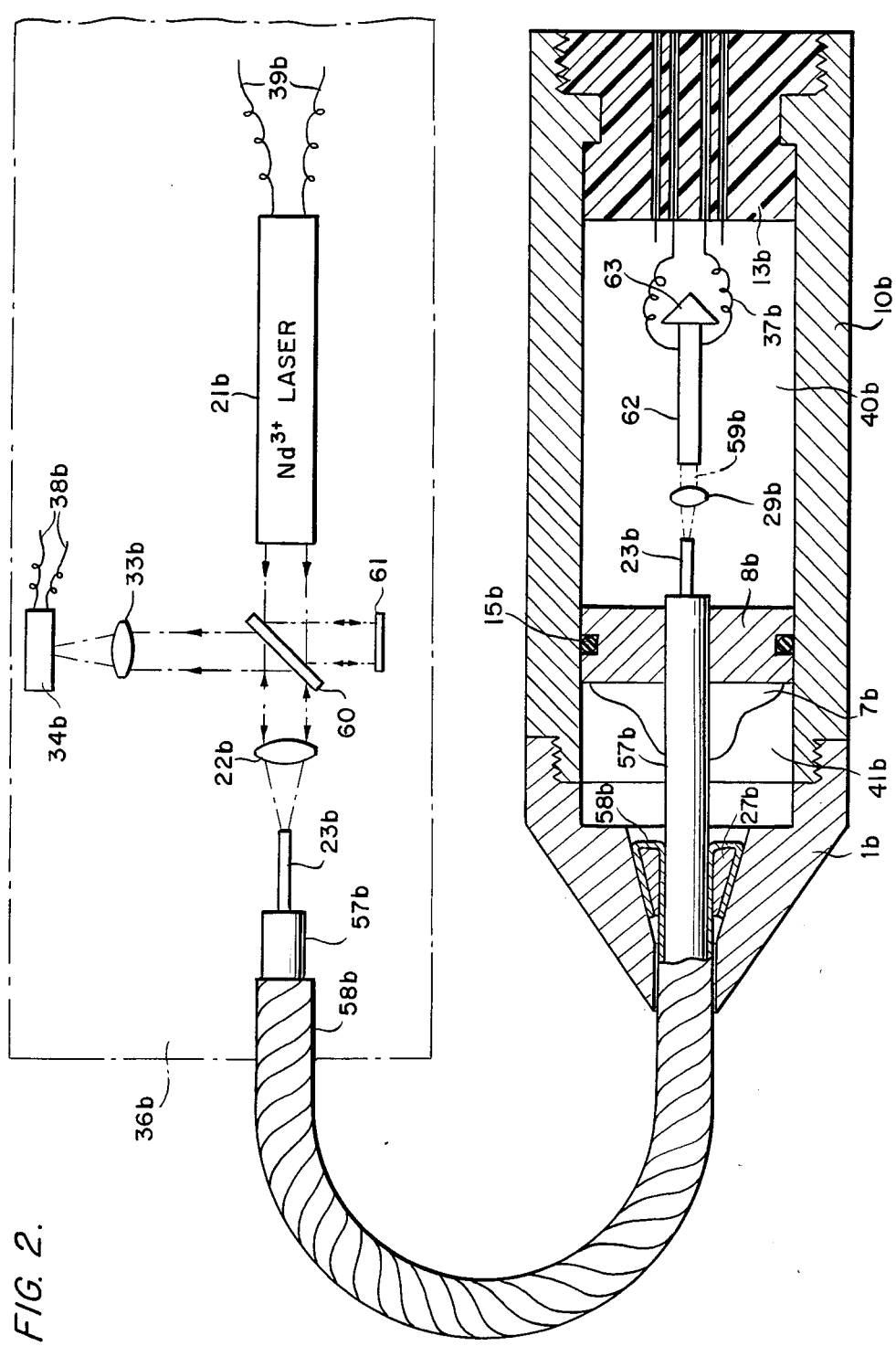
FIG. 2 illustrates an alternative embodiment of the combination of features which, in accordance with the teaching of the invention, provides a solution to the problem of transmitting data rapidly from a downhole logging probe to the surface.

The light transmitted down the drill hole is modulated with the data stream and retransmitted to the surface using either of the alternative illustrated embodiments depicted in FIGS. 1 and 2 respectively.

In the embodiment depicted in FIG. 1, the laser light is transmitted down through fiber 23a, modulated in the chamber, 40a, retransmitted upthrough a second fiber, 28, and focused by the lens, 33a, onto the detector, 34a. The detector and its amplifier draw power through leads, 38a, connected to slip rings (not shown). In a preferrerd embodiment, the detector is a germanium avalanche photodiode.

The ends of the fibers, 23a and 28, are accurately positioned at the foci of lenses, 29a and 30 respectively. Thus, the infrared light emerging from the fiber, 23a, is collinated into the beam, 59a, and passes through the optical elements 35, 31, and 32, and then is refocused into the fiber 28, for retransmission back up to the surface. The optical elements, 35,31, and 32, are components of a light beam modulator. The modulator may be any of several types, such as an acousto optic modulator. However, it is preferably an electro-optic crystal modulator, since this type can be made insensitive to temperature changes. The elements, 35, are the light polarizes needed for this type of modulator. The electro-optic crystal may be divided into four crystals, arranged to provide double compensation, as shown on page 17-12 of the "Handbook of Optics", sponsored by the Optical Society of America. The electro-optic crystals are preferably made of lithium tantalate, which has a high electro-optic coefficient, a high curie temperature, and a low loss tangent at a high modulation frequency. The application of electric voltages to the electrodes on the elements, 31, is indicated figuratively by the wires, 37a, from the multipin connector, 13a, which are powered by electric signals from the instrument probe (not shown). The prism, 32, reverses the course of the light beam back toward the optical fiber, 28. The various components of the modulator and fiber ends are mounted on a tray of low thermal coefficient, such as "INVAR", an alloy of nickel and iron.

The optical transmission system depicted in FIG. 1 employs direct detection of amplitude modulated light. An advantage of this mode of operation is that multimode fibers with a core diameter of 50 micrometers or more may be used. This facilitates the maintenance of the position of a focused spot of light on the end of the fiber. A separate fiber, 28, is included in the cable to transmit light up to the detector. This permits optical isolation of the detector end of the fiber, 28, from the laser end of fiber, 23a, and thus avoids reception of light scattered back from the laser end of fiber, 23a. It also avoids loss of light at the beam splitter which would be necessary if a single fiber were used for both the up and down transmissions. This system is also insensitive to stretching of the cable.

If more than one optical channel is required, several fibers can be included to return the light to the surface from several separate modulators. However, only one fiber, 23a, is required to transmit light from the laser down to the several modulators. The light from fiber 23a can there be divided by several beam splitters.

The alternative embodiment of the invention depicted in FIG. 2 employs optical homodyne detection instead of direct detection of the modulated light transmitted up from the downhole probe. In accordance with the invention, the neodymium laser, 21b, is constrained to oscillate at a wavelength, $\lambda = 1.32$ micrometers. A substantial portion of the emerging beam is focussed by the lens, 22b, into the core of the optical fiber, 23b. This light is transmitted down to the instrument probe connector, is modulated with the data signal and retransmitted up the same fiber. The emerging light is, in part, directed by the beam splitter, 60, to the detector, 34b.

In the well-known homodyne detection process, the signal modulated beam is joined coherently with a portion of the unmodulated laser beam, usually referred to as the "local oscillator" beam. That is, the two beams are superposed with parallel wavefronts as they approach the detector through the lens, 33b. This is accomplished by means of the beam splitter, 60, and the reflector, 61. Alternatively, the reflector, 61, may be dispensed with, and the local oscillator beam obtained as a reflection from the front face of the core of the fiber to ensure coincidence of the wavefronts.

In practice, the shot noise generated by detection of the local oscillator beam exceeds the noise inherent in the detector. On the other hand, interference of the signal and local oscillator waves in the detector generates an electrical signal of frequency equal to the difference frequency of these waves, and a current which is proportional to the product of their amplitudes. Thus the data signal is amplified in proportion to the noise. The result is that the signal-to-noise ratio can be greater than with direct detection even if the detector is a germanium PIN diode instead of an avalanche photodiode, provided that the two waves are spatially coherent at the detector. This requirement means that the fiber, 23b, must be a single mode fiber. That is, the fiber will transmit only the two degenerate lowest order optical waveguide modes.

The light travelling down the fiber, 23b, emerges in the sealed space, 40b, within the connector shell, 10b. The emerging light is collimated by the lens, 29b, into the beam, 59b, which passes through the single crystal modulator, 62. The light is reflected back through the modulator, 62, by the retro-reflecting cube-corner prism (prism), 63, and refocussed into the core of the fiber, 23b, and then up to the surface. The core of a single mode fiber, in which the light is confined, is typically about 5 micrometers in diameter, compared with 50 micrometers or more in a multimode fiber. Since 5 micrometers is only 4 wavelengths of neodymium light, the beam, 59b, must be returned from the modulator, 62, and refocussed by lens, 29b, precisely onto the core of the fiber, 23b, despite the movements resulting from temperature changes in the equipment. This is accomplished by utilizing a cube corner retro-reflector as the prism, 63. This prism has th property of reflecting a ray back in a direction precisely opposite to that of the impinging ray.

The modulator, 62, may be an acousto-optic crystal modulator, or an electro-optic crystal modulator. In the latter case, with a single crystal and without a polarizer and analyzer, the light beam will be phase modulated with the signal applied by the wire leads, 37b. The returning light can be demodulated by the homodyne detection system, in contrast to direct detection.

The embodiment of the invention depicted in FIG. 2 is similar to that depicted in FIG. 1 in all aspects not described above, e.g., the cable design, and the sealing of chamber, 40b, by the boot seal, 7b, pressing on the low-diffusivity jacket, 57b.

In this preferred embodiment of the invention, the modulated laser light coming up through the cable is detected and demodulated by a receiver located in the rotating barrel of the cable reel. The electrical data signal must then be transmitted to stationary data processing or recording equipment. If the data transmission rate is less than about 1 megahertz, the signal may be transmitted reliably through conventional slip rings on the extended axle of the cable reel. However, if the rate is higher, the bit error rate will increase to unacceptable levels due to electrical noise and cross-talk. This can be avoided by retransmitting the data stream optically to a stationary detector through either of two alternative "optical slip rings" described below.

Figure 5:
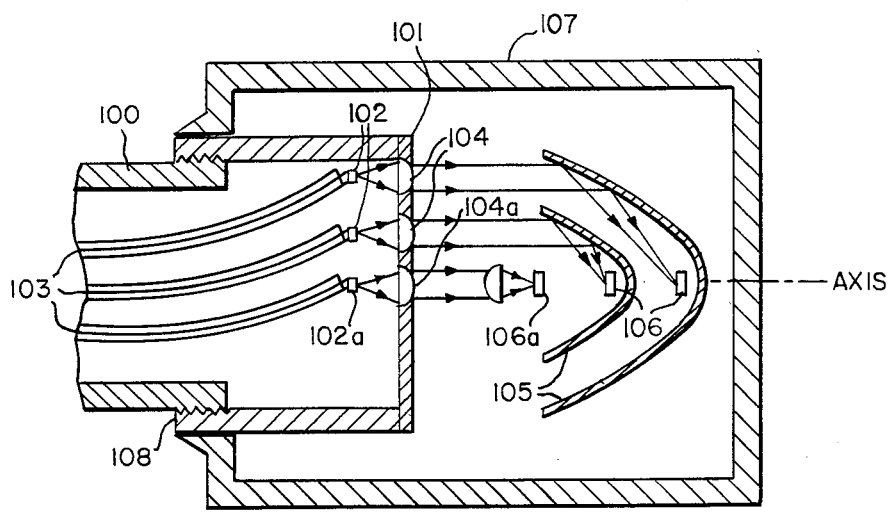
FIG. 5 is an axial sectional view through an extended axle portion of a cable reel adapted for transmission of three separate light beams.

FIG. 5 is a view of a section through the axis of the extended axle of a cable reel. It is adapted for transmission of three separate light beams through "optical slip rings". In this embodiment of the invention, modulated laser light signals transmitted up through three optical fibers in the cable are demodulated in the barrel of the cable reel. The resulting electrical signals are conducted through coaxial cables, 103, in the axle to light emitting diodes (LEDs) or laser diodes, 102 and 102a. It is evident that signal light emitted by the light source, 102a, on the axis of the rotating axle is collimated by the lens 104a and thence focused on the stationary detector, 106a. Supporting structures and a coaxial lead from the detectors are omitted for clarity. It is not so obvious that light from the two (or more) sources, 102, positioned at different radial distances from the axis will remain focused on the stationary detectors, 106, by the nested paraboloidal reflectors, 105, as the beams revolve around the axis. Annular sections of lenses could be used to focus the signal light on the detectors, but the paraboloidal reflectors are preferable, since they also serve the function of optical and electrical shielding.

In principle, the ends of the optical fibers from the cable could be positioned directly in place of the light sources, 102 and 102a, rather than regenerating light signals. However, the power of the laser light returning to the surface will be small, and would be further attenuated by the insertion loss of the optical slip rings. This would impose ultra-precise tolerances on all components. Also, awkwardly bulky avalanche photodiodes would be needed, instead of tiny PIN diodes as the detectors, 106 and 106a.

The light source, 102a, and detector, 106a, can be interchanged to transmit in the opposite direction to provide down link command signals to the probe.

The optical slip ring assembly is protected from the outside environment by a stationary housing, 107, which fits closely around the fitting, 108, which rotates with the axle, 100.

Figure 6:
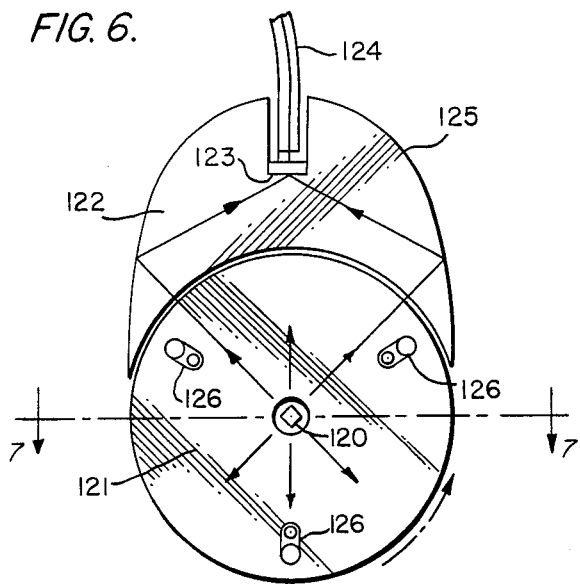
FIG. 6 is a sectional view of an alternative optical slip ring assembly for transmitting light signals from a rotating axle to a stationary detector.
Figure 7:
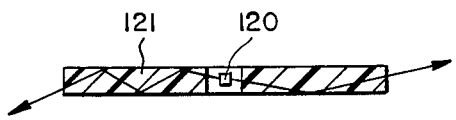
FIG. 7 is a section on line 7—7 of FIG. 6.

FIGS. 6 and 7 are two views (one along the axis of the axle and the other of section 7—7) of a schematic drawing of an alternative "optical slip ring" for transmitting light signals from the rotating axle to an adjacent stationary detector. A light source, 120, is positioned on the axis to radiate a modulated light signal in all radial directions into a transparent disc, 121, with a small hole in the center for the light source. The disc may be made of an acrylic resin or similar transparent plastic. The light is confined to the disc by total internal reflection, and makes its way out the edge of the disc. A stationary transparent sheet, 122, of about the same thickness as the disc, conforms to a substantial fraction of the disc perimeter except for a clearance to allow the disc to rotate with the axle. The outer edge, 125, of the sheet reflects the light to a diode detector, 123, which is connected to a coaxial lead, 124. The shape of the sheet edge, 125, is part of an ellipse with foci at the light source and at the detector. Thus, a substantial fraction of all the light emitted by the source is gathered at the detector.

The light source may be an edge-emitting LED or, if the modulated signal frequency is higher than about 30 MHz, a laser diode may be utilized. Since a laser diode does not radiate into all 360° in the plane of its junction, the desired pattern of radiation into the disc can be realized by placing the laser to radiate a beam along the axis. The beam is then deflected radially into the disc by a conical reflector coaxially positioned at 120 with its apex toward the laser. Alternatively, the laser can be placed in the barrel of the reel, along with its electronic driver, and the emitted light signal conducted through a short length of optical fiber through the axle to the apex of the reflecting cone.

Multiple optical fiber channels are transmitted through separate optical slip rings (of the type illustrated in FIG. 6) which are spaced along the axis of the extended axle of the cable reel. The slots, 126, in the light confining disc, 121, are provided to allow structural members and electrical or light conductors to pass through the disc without obscuring more than a small fraction of the light.

In the foregoing two illustrative arrangements of the invention have been described. Many variations and modifications of the invention will now occur to those skilled in the art. It is accordingly desired that the scope of the appended claims not be limited to the specific disclosures herein contained.

I claim:

1. An optical communication system for high temperature and high pressure drill hole logging comprising:
   a. a laser light source which oscillates at a wavelength greater than 1 micrometer;
   b. an armored cable;
   c. at least one of a plurality of optical fibers in said armored cable for transmitting laser light down and up the drill hole;
   d. cable head connector shell connected to the cable at the downhole end;
   e. in the cable head connector shell, means for modulating the laser light with a data signal;
   f. means for demodulating the data signals from the modulated laser light received at the upper end of the cable;
   g. separate sources for each light signal positioned in the axle to radiate separate light beams at different radial distances from the axis to the axle;
   h. separate, stationary, concentric, rotationally symmetric means for focusing the separate light beams to separate spots spaced along the extended axis of the axle;
   i. separate detectors located at the separate spots to intercept and convert the light signals to electric signals.

2. The optical communication system as defined in claim 1 wherein the laser light source is neodymium laser.

3. An optical transmission system as defined in claim 2 wherein the neodymium laser is constrained to oscillate at a wavelength which is approximately 1.32 micrometers.

4. The optical communication system as defined in claim 2 wherein the optical fiber which transmits modulated light up from the probe is a separate fiber from the fiber which transmits light down to the probe.

5. The optical communication system as defined in claim 1 wherein the optical fiber which transmits modulated light up from the probe is the same fiber which transmits light down to the probe.

6. The optical communication system as defined in claim 5 wherein light passing through the means for modulating the light is redirected back into the fiber by means of a retro-reflector.

7. The optical communication system as defined in claim 1 in which the optical fiber will not transmit more than 2 optical modes.

8. The optical communication system as defined in claim 7 in which the means for demodulating the data signal from the modulated light is an optical homodyne detection apparatus.

9. The optical communication system for high temperature and high pressure drill hole logging as defined in claim 1 wherein the means for modulating the laser light with a data signal includes an electro-optic crystal modulator substantially insensitive to temperature changes.

10. An optical communication system for high temperature and high pressure drill hole logging comprising:
   a. a laser light source which oscillates at a wavelength greater than 1 micrometer;
   b. an armored cable;
   c. at least one optical fiber in said armored cable for transmitting laser light down and up the drill hole;
   d. a cable head connector shell connected to the cable at the downhole end;
   e. in the connector shell, means for modulating the laser light with data signals;
   f. means for demodulating the data signals from the modulated laser light received at the upper end of the cable;
   g. a chamber in said cable head connector shell sealed against the ambient liquid into which the cable passes;
   h. said chamber housing the end of the at least one optical fiber and the means for modulating the laser light with data signals; and
   i. a multipin electrical connector adapted to mate with an instrument logging probe; thereby eliminating an optical fiber connector at the down-hole end.

11. A system for transmitting multiple distinct light signals from the end of a rotating axle to stationary detectors, comprising:
   a. separate sources for each light signal positioned in the axle to radiate separate light beams at different radial distances from the axis of the axle;
   b. separate, stationary, concentric, rotationally symmetric means for focusing the separate light beams to separate spots spaced along the extended axis of the axle;
   c. separate detectors located at the separate spots to intercept and convert the light signals to electrical signals.

12. The optical communication system as defined in claim 11 in which the means for demodulating the data signal from the modulated light is an optical homodyne detection apparatus.

13. A system for transmitting multiple distinct light signals from rotating axle to stationary detectors through separate optical channels, each comprising:
   a. at least one means for radiating light signals positioned within the axle near its axis;
   b. means for directing the light through transparent pathways in substantially all radial directions throught the perimeter of the axle;
   c. a stationary, concave reflecting means with a substantially elliptical sectional shape positioned adjacent to the rotating axle for focusing the light signal emerging from the transparent pathways to a stationary spot; and
   d. a detector at the stationary spot for converting the light signals to electrical signals.

14. An optical communication system for high temperature and high pressure drill hole logging comprising:
   a. a laser light source which oscillates at a wavelength greater than 1 micrometer;
   b. an armored cable;
   c. at least one of a plurality of optical fibers in said armored cable for transmitting laser light down and up the drill hole;
   d. a cable head connector shell connected to the cable at the downhole end;
   e. in the cable head connector shell, means for modulating the laser light with a data signal;
   f. means for demodulating the data signals from the modulated laser light received at the upper end of the cable;
   g. at least one means for radiating light signals positioned within the axle near its axis;
   h. means for directing the light through transparent pathways in substantially all radial directions through the perimeter of the axis;
   i. stationary, concave reflecting means with a substantially elliptical sectional shape positioned adjacent to the rotating axle for focusing the light signal emerging from the transparent pathways to a stationary spot for converting the light signals to electrical signals.

* * * * *

UNITED STATES PATENT AND TRADEMARK OFFICE
CERTIFICATE OF CORRECTION

PATENT NO.  :  4,547,774
DATED       :  October 15, 1985
INVENTOR(S) :  Gordon Gould It is certified that error appears in the above-identified patent and that said Letters Patent is hereby corrected as shown below:

Claim 1 at the end of recital "F" omit the ";" and insert and further including a reel for winding up the armored cable containing a purality of optical fibers, and a system for transmitting multiple distinct light signals from the end of the rotating axle of the reel to stantionary detectors, comprising;

Claim 14 at the end of recited "F" omit the ";" and insert and further including a reel for winding up the armored cable containing a plurality of optical fibers, and a system for transmitting multiple distinct light signals from the rotating axle of the cable reel to stationary detectors through separate optical channels, each comprising:

Signed and Sealed this

Twenty-fifth Day of March 1986

[SEAL]

Attest:

DONALD J. QUIGG

Attesting Officer          Commissioner of Patents and Trademarks